United States Patent
Hall

[15] 3,644,161
[45] Feb. 22, 1972

[54] PROCESS FOR CURING AIR-INHIBITED RESINS BY RADIATION

[72] Inventor: Roger P. Hall, Mayfield Heights, Ohio
[73] Assignee: SCM Corporation, Cleveland, Ohio
[22] Filed: Nov. 13, 1967
[21] Appl. No.: 682,140

[52] U.S. Cl. ..................156/272, 156/184, 156/324, 161/233, 204/159.15, 260/856, 260/861, 260/872
[51] Int. Cl. .......................................................B29c 19/02
[58] Field of Search ........204/162 HE, 163 HE, 249, 159.14, 204/159.15; 156/272, 229

[56] References Cited

UNITED STATES PATENTS

| | | | |
|---|---|---|---|
| 2,668,133 | 2/1954 | Brophy et al. | 156/272 |
| 2,897,092 | 7/1959 | Miller | 204/159.14 |
| 2,897,127 | 7/1959 | Miller | 204/159.14 |
| 2,997,418 | 8/1961 | Lawton | 156/272 |
| 2,997,419 | 8/1961 | Lawton | 156/53 |
| 3,084,114 | 4/1963 | Gilbert et al. | 206/159.14 |
| 3,397,101 | 8/1968 | Rausing | 156/229 |
| 3,405,027 | 10/1968 | Wyckoff | 161/113 |

Primary Examiner—John C. Bleutge
Assistant Examiner—Richard B. Turer
Attorney—Merton H. Douthitt, Wesley B. Taylor and Harold H. Baum

[57] ABSTRACT

A process for curing a normally air-inhibited, thermosetting resinous reaction product comprising exposing a film or coat of the resin while overlying a substrate to high-energy radiation to cure at least a depthwise segment of the film that is contiguous to the substrate to provide a nontacky, mar-resistant undersurface to the film, then inverting the film on a substrate, and again exposing the inverted film to high energy radiation or to heat. Electron emission, microwaves, ultraviolet light, and the like may be used as the high-energy radiation. As a modification, the resin film or coat may be stretched prior to completing the second exposure. As a further modification, the resin film may be laminated to a substrate during the second exposure, preferably with an adhesive curable by exposure to such high energy radiation.

12 Claims, 1 Drawing Figure

PATENTED FEB 22 1972 3,644,161
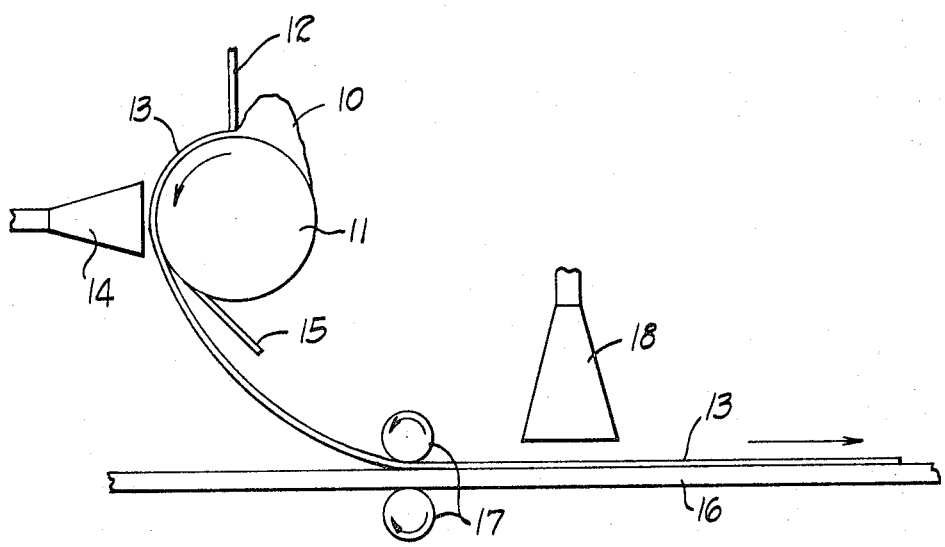
INVENTOR.
ROGER P. HALL
BY Wesley P. Taylor
ATTORNEY.

PROCESS FOR CURING AIR-INHIBITED RESINS BY RADIATION

BACKGROUND OF THE INVENTION

Many thermosetting resins, such as those typified by thermosetting, unsaturated polyester resins, exhibit air-inhibited curing at their air-contacting surfaces. Such surfaces are softer than the interiors of the resins and are therefore more easily scratched and marred. Obviously, these qualities are undesirable, especially when such a resin is to be used for coating purposes. Several techniques have been suggested to overcome air inhibition in the curing of resins. For example, U.S. Pat. No. 3,210,441 to Dowling et al. is based on the discovery that the presence of esterified residues of monohydroxy acetals in polyester resins of particular formulation are free of air inhibition.

Within relatively recent years, the polymerization of resinous materials by electron radiation has increasingly become of interest. However, the use of this technique has encountered the same difficulty with many thermosetting resins, namely, air inhibition at the resin-air interface. During penetration by high-energy radiation, the resinous material undergoes an "ionization effect" which induces chemical reactions including polymerization; note U.S. Pat. No. 2,863,812 to Graham. Radiation, such as a beam of electrons, has not been found to have any appreciable ionization effect at the exposed surface of irradiated material. The desired ionization effect is obtained only after penetration of the resinous material. Previously, attempts have been directed to modify the radiated energy so as to obtain an ionization effect after relatively short distances of penetration. For example, in U.S. Pat. No. 2,863,812 to Graham, electrons pass through an electrically conductive shield before impinging upon the material to be radiated. This technique, of course, increases and complicates the type of apparatus used for the radiation.

It would, accordingly, advance the art if the use of high energy radiation could be adapted easily to cure completely such air-retarding polymerization, especially without requiring any chemical modification of the resinous material itself or additional and complicating radiation apparatus.

SUMMARY OF THE INVENTION

While the use of high-energy radiation has been found effective in curing or polymerizing thermosetting resins, its use has not overcome the inhibition to cure of certain resins, notably, thermosetting, unsaturated polyester resins, in the presence of oxygen and, in some cases, nitrogen as well. In the present invention, advantage is taken of this inherent air inhibition to bond the resin, particularly in film-form to a substrate, by the use of substantially a two-step process.

More particularly, a film or coat of an incompletely cured, normally air-inhibited, thermosetting resin is formed over a substrate and then exposed to high-energy radiation from a suitable, conventional source to cure at least a depthwise portion of the film that is contiguous to the substrate and remote from the source. Normally, the radiation exposure cures the entire film except for the upper, exposed surface which remains tacky and mar-susceptible. This may be due to the chemical combination of oxygen or other elements (from the air) which render such upper surface incapable of cure to a mar-resistant state. In any event, the depthwise cure is at least sufficient to impart mass integrity to the film. The film is then turned over usually, but not necessarily, on the same substrate to present topside the nontacky, mar-resistant surface of the film. The film may then be heated at temperatures to complete any possible further cure, especially when it is desired to laminate the film to a substrate. Preferably, however, the film is again exposed to high-energy radiation. This step also may be used to effect lamination and without the need for externally applied heat.

As modifications, it has been found that if the film or coat is stretched to reduce its thickness prior to or during the second exposure, there is a faster cure. Also, as indicated, the second exposure step can be used as a laminating step wherein the substrate at that juncture, which may be wood, metal, plastics, paperboard, or the like, defines a lamina to which the resinous film is adhered. In this modification, an adhesive between the substrate and film may be used to facilitate lamination.

BRIEF DESCRIPTION OF THE DRAWING

The accompanying FIG. 1 schematically illustrates the present process for curing an air-inhibited resin by radiation when adapted for continuous operation.

DESCRIPTION OF THE PREFERRED EMBODIMENTS

The resinous materials contemplated by the present invention are those which are convertible by high-energy radiation to higher molecular weight compositions and which possess an inhibition to such conversion in the presence of gases such as nitrogen and particularly oxygen. Many resins suffer in some degree, more or less, from this shortcoming. Usually such resins contain appreciable amounts of unsaturated carbon-to-carbon linkage. For example, partially cured polybutadiene, polyisoprene, and resins formed from styrene, methacrylates, acrylates, maleates, fumarates, etc., may exhibit air inhibition. A specific example of an air-inhibited resin is the condensation product of 3 moles of hydroxypropyl methacrylate and 1 mole of hexamethoxy-methylmelamine. The resulting product can be cured in accordance with the present invention either as so condensed or as further reacted with an olefinic compound such as a vinyl monomer like styrene. The olefinic compound may serve as a solvent for the resin, or if desired, a nonreactive, fugitive solvent may be used.

However, the invention finds chief application in the curing of unsaturated polyester resins, especially when blended with one or more reactive olefinic, unsaturated compounds, such as vinyl monomers, which serve as cross-linkers. It is the cross-linking which is difficult to realize to a maximum obtainable degree by ordinary techniques in an oxygen atmosphere.

Such polyesters are well known in the art and may, for example, be derived from reaction between alcohols including ethylene, propylene, butylene, diethylene, dipropylene, trimethylene, and triethylene glycols, and polyols like gylcerine; and unsaturated polybasic acids including maleic acid, maleic anhydride, fumaric acid, chloromaleic acid, itaconic acid, citraconic acid, mesaconic acid, and the like.

Typical cross-linking monomers include styrene, vinyl toluene, methyl methacrylate, alpha-methyl styrene, divinyl benzene, dichlorostyrene, lower dialkyl maleates, and lower dialkyl fumarates. Still other useful cross-linkers include: ethylene glycol diacrylate, ethylene glycol dimethacrylate, diethylene glycol diacrylate, diethylene glycol dimethacrylate, triethylene glycol diacrylate, triethylene glycol dimethyacrylate, tetraethylene glycol diacrylate, tetraethylene diamethyacrylate, trimethyol propane triacrylate, trimethylol propane trimethacrylate, hydroxy ethyl acrylate, hydroxy ethyl methacrylate, hydroxy propyl acrylate, and hydroxy propyl methacrylate. As an advantage of the radiation curing, little or no catalyst need be included in the resin mix.

A minor portion, that is, up to about 40 mol percent, of the unsaturated acid can be replaced with saturated and/or aromatic polycarboxylic acids or their chlorinated counterparts. Typical acids which can be used for the indicated replacement are phthalic, isophthalic, adipic, pimelic, glutaric, succinic, suberic, sebacic, azelaic, chlorinated phthalic, tetrahydrophthalic, hexahydrophthalic anhydride, and the like.

In general, the nature of the substrate is not critical. Wood, plastics, metal, glass, paperboard, and the like may be used. In some instances, the type of radiated energy employed may influence the choice of the substrate as hereinafter noted. The same or different substrate may be used for each exposure to radiation.

As used here and in the claims, the term "high-energy radiation" is taken to include particle emission or electromagnetic radiation. The particles can be electrons, protons, neutrons, α- particles, etc. The electromagnetic radiation can be radio waves, microwaves, infrared waves, ultraviolet waves, X-rays gamma rays, and the like. The radiated energy may be applied to the resinous material in one or more doses for each of the described exposures, that is, for each side of the film. As a general guide, only that amount of energy need be applied in any case that completely penetrates and cures the resin, as herein contemplated, and within a time period at least comparable to that for a conventional heat-activated reaction for the same material. Excess energy is not only wasteful, but results in undesired heating of the resinous material and attendant apparatus with possible charring and other decomposition. The amount of energy required depends on several factors, such as the nature and thickness of the resinous film, extent of prior cure, if any, distance between the energy source and resin, and the like. The requisite amount of energy for any given situation may be readily determined by trial and error.

With respect to electron bombardment, suitable sources of radiation include radioactive elements, such as radium, Cobalt 60, and strontium 90, Van de Graaff generators, electron accelerators, and X-ray machines. The latter may be of the type supplying from about 100 to about 300 Kev. (thousand electron volts) at about 10 to 1,000 milliamperes. As reported in British Pat. No. 949,191, in most commercial applications of irradiation techniques, electrons have been used having an energy of between 500 and 4,000 Kev. Such electrons have a useful penetration of about 0.1 to about 0.7 inch in organic material having a specific gravity of around one. As another measure of radiation, U.S. Pat. No. 3,247,012 to Burlant discloses that the potential of an electronic beam for radiation purposes may be in the range of about 150,000 to about 450,000 volts.

By microwaves and microwave energy is meant electromagnetic wave energy of about $10^7$ to $10^{13}$ cycles per second. Microwaves can be generated by radiofrequency power tubes such as the magnetron, amplitron and klystron. Their frequencies range between about 300 MHz. and 300,000 MHz., "MHz." designating one megahertz and being equal to $10^6$ cycles per second. U.S. Pat. No. 3,216,849 to Jacobs describes and illustrates one type of microwave generator which may be used. Normally, a 10- to 50-second exposure to microwaves suffices for curing a film of resinous material, depending on the intensity of the microwaves.

In the case of microwave radiation, it is preferred to use a nonmetallic substrate for a more effective and faster cure. Metal tends to reflect microwaves as a mirror reflects light waves, and this interferes with a desired absorption of the microwaves by thin films of resinous materials. Also, polar resinous materials like polyester-reactive resins much more readily absorb microwave energy than nonpolar materials. However, unlike electron beams, microwaves can reach sharply indented parts and require no shielding. If desired, a combination of high-energy radiation with a reaction catalyst in the resin mix may be used.

In practice, a resinous mix adapted for radiation cure is applied by standard means as a film, layer, or coat onto a substrate which is preferably relatively smooth and nonadherent with respect to the resin film to facilitate subsequent separation. Since the cure is to be in situ, the resin mix may be a solvent-free polymerizable admixture of the reactive ingredients. Such a mix may have previously undergone some polymerization but to a degree insufficient to alter the substantially fluid character of the mix. Of course, the mix may, if desired, contain a nonreactive solvent which in time evaporates. The film is then subjected to the first radiation exposure. In the usual case, this exposure can cure substantially the entire thickness of the film except for the upper surface. This remains relatively soft and tacky and mar-susceptible. The reasons for the persistant inhibition to a final cure are not clearly known but are suspected to be due to either the surficial occlusion or chemical combination of a gas like oxygen or nitrogen.

In any event, since a two-stage radiation is contemplated, the cure at the first stage need only be sufficient to impart mass integrity to the film, so that it may be lifted and inverted onto the same or different substrate. A hard, mar-resistant, upper bare surface is thus obtained. Thereafter, heating or a second exposure to radiation is carried out. Either treatment may not necessarily make the undersurface (formerly the top surface) completely tack-free even at this juncture, but it does serve to complete any cure possible and may also serve a highly useful function of laminating the film to a substrate.

In this instance, the substrate defines a lamina. When the lamina is relatively porous, as in the case of plywood, no adhesive aid may be necessary. The uncured, tacky "skin" of the resin film may sufficiently penetrate the wood to form a mechanical or chemical bond therewith. However, it is within the contemplation of the invention to apply an adhesive to the uncured or tacky side or face of the resin film or, more preferably, to the substrate itself, prior to inversion of the film and placing it over such substrate preparatory for the heating or second radiation exposure. This is particularly true when the substrate is smooth and nonporous as in the case of glass. A wide gamut of adhesives known in the art may be used. The only requirement is that the final treatment, for example exposure to radiation, does not destroy the adhesive qualities.

A preferred manner of laminating the resinous film to a substrate is to use an adhesive which is curable by radiation and/or chemically reactive with the uncured side of the film. The choice of a chemically reactive adhesive is determined largely by the chemical nature of the resin itself. In the case of the described and preferred polyester resins, the chemically reactive adhesive may be an additional layer of the same or different polyester reaction mix as that from which the original film is formed; or the chemically reactive adhesive may be any of the previously disclosed cross-linking agents, for instance, styrene, or a mixture of a polyester resin mix and a cross-linker. In any case, the chemically reactive adhesive may also be in an unreacted or partially reacted stage. One chief advantage of using such materials to define a chemically reactive adhesive is that the materials are also subject to cure by radiation, so that the entire assembly is simultaneously finally cured and bonded (either chemically or mechanically) to a substrate to form a laminate by the same radiation exposure. As a further modification, the adhesive may if desired contain a catalyst effective to catalyze a reaction between the adhesive and the resin film.

At any time prior to the final heating step or the second exposure, whichever is used, the film may be stretched to reduce its gauge or thickness. This technique is especially useful where quite thin films are desired, and it is not feasible to work with such thin films prior to a final cure. For example, films may be stretched to reduce their thickness from about 10 mils to 2 mils. The film may be stretched to a point short of forming pinholes, tears, and the like. The stretching may be accomplished manually or by clamps mounted to grip edges of the film and moved relatively away from one another.

The following examples are intended merely to illustrate the invention and should not be construed as limiting the claims.

EXAMPLE 1

A partially cured thermosetting polyester resin was prepared by reacting equal molar portions of 1,3-propylene glycol and maleic anhydride. Water was removed by evaporation until the residue had an acid number of 35. An amount of 70 parts of the cooled reaction produce was then mixed with 30 parts of styrene monomer, all by weight.

Referring to the accompanying figure, a supply 10 of the resulting polyester resin mix was continuously dumped onto a slowly rotating drum 11 having a chrome-plated surface to minimize adherence with the mix. A doctor knife 12 smoothed the mix to a film form 13 which is enlarged in the figure for purposes of illustration. An electron accelerator 14 of standard construction bombarded the film 13 with a radiation of 20 megarades as it passed at a rate of about 20 feet per minute. In general, the radiation strength of the gun 14 and the speed of rotation of the drum 11 are synchronized to cure at least enough of the film that it has sufficient mass integrity to be stripped from the drum 11 as by a knife edge 15 without rupturing.

A continuous conveyor 16 caught the film 13 between nipper rolls 17 after which the film was passed under a second electron accelerator 18. The topside of the film 13 at this time was the underside of the film when it overlay the drum 11. The gun 18 produced sufficient radiation intensity to complete any possible further cure of the film 13. The film was finally stripped from the conveyor 16.

EXAMPLE 2

A procedure was carried out like the procedure of Example 1 except that the conveyor 16 also carried a plywood substrate having an adhesive coating of a polyester resin prepared by partially reacting equal molar amounts of diethylene glycol and maleic anhydride with removal of water until an acid number of 35 resulted. An amount of 70 parts of the resulting condensation product was dissolved in 30 parts of a styrene monomer, all by weight.

The plywood substrate with the adhesive coat topside was interposed between the conveyor 16 and film 13 at the nipper rolls 17. Subsequent exposure to radiation from the electron accelerator 18 not only completed any possible further cure of the film but also cured the adhesion coating on the plywood as well and chemically bonded the film 13 to the wood to form a laminate.

All patents herein cited are hereby incorporated by reference.

While the foregoing describes preferred embodiments and various modifications of the invention, it is understood that the invention may be practiced still in other forms within the scope of the following claims.

What is claimed is:

1. A process for producing a cured film of a normally air-inhibited, thermosetting resinous reaction product in which both major faces of the film are substantially free of incomplete cure due to such air-inhibiting effect, comprising:
   a. placing an uncured film of said resin in contact with a protective substrate effective to shield a contiguous face of said film from the ambient atmosphere, while leaving the opposite face of said film open to such atmosphere,
   b. directing high-energy radiation through the film and toward said substrate to cure completely a depthwise segment of the film along said shielded face contacting the substrate to a nontacky, mar-resistant finish, while leaving at least said opposite face of the film in a relatively tacky, mar-susceptible condition due to the air-inhibited character of said resin,
   c. then placing the film in an inverted position in contact with a protective substrate effective to shield the originally exposed, opposite face of the film from the ambient atmosphere, while leaving the radiated contiguous face of the film exposed to such atmosphere, and
   d. completing the cure of said originally exposed, opposite face of the film while in said shielded position against the substrate to effect an adhesive bond between said film and said substrate.

2. The process of claim 1 wherein said further cure comprises again exposing the inverted film to high-energy radiation.

3. The process of claim 1 wherein said further cure comprises heating the inverted film.

4. The process of claim 1 wherein said resin is an unsaturated polyester resin contained in a solvent including an olefinic compound reactive with said polyester resin.

5. The process of claim 4 wherein said olefinic compound is a vinyl monomer.

6. The process of claim 1 wherein said high-energy radiation is electromagnetic radiation.

7. The process of claim 1 wherein said high-energy radiation is by particle emission.

8. The process of claim 1 wherein the film is stretched after said exposure and prior to said completing any further cure.

9. The process of claim 1 wherein a different substrate is used for said radiation exposure and for said completion of the cure, the first substrate for the radiation exposure being relatively smooth and nonadherent with said resinous film to facilitate separation therefrom, the second substrate being effective to form said adhesive bond with the film during said completion of the cure.

10. The process of claim 9 wherein the second substrate which receives the inverted film has a layer of an adhesive material effective to facilitate the bond between the film and said second substrate.

11. The process of claim 10 wherein said adhesive material chemically reacts with the resin of said film to bond the film and adhesive material together.

12. A process for laminating a tack-free, mar-resistant resin coating onto a substrate from a normally air-inhibited, unsaturated thermosetting polyester resin-forming mix, comprising:
   a. placing an uncured, fluid film of the mix in contact with a protective substrate effective to shield a contiguous face of the film from the ambient atmosphere, while leaving the opposite face of the film open to such atmosphere,
   b. directing high-energy radiation from a source thereof through the film and toward said substrate to cure that portion of the film contiguous to the substrate and remote from said source to a nontacky, mar-resistant state that extends at least to a sufficient depthwise thickness to impart mass integrity to the fluid film, while leaving at least said opposite face of the film in a relatively tacky, mar-susceptible condition due to the air-inhibited character of said resin,
   c. then placing the film in an inverted position in contact with a protective substrate effective to shield the originally exposed, opposite face of the film from the ambient atmosphere, while leaving said radiated, mar-resistant, contiguous face of the film exposed to such atmosphere, and
   d. again directing high-energy radiation through the film and toward said substrate in a direction opposite to that of the first radiation to cure said originally exposed, opposite face of the film while in said shielded position on the substrate and to effect an adhesive bond between said film and last-mentioned substrate.

* * * * *